US005277965A

United States Patent [19]

Malhotra

[11] Patent Number: 5,277,965

[45] Date of Patent: Jan. 11, 1994

[54] RECORDING SHEETS

[75] Inventor: Shadi L. Malhotra, Mississauga, Canada

[73] Assignee: Xerox Corporation, Stamford, Conn.

[21] Appl. No.: 561,430

[22] Filed: Aug. 1, 1990

[51] Int. Cl.$^5$ .......... B32B 7/02

[52] U.S. Cl. .......... 428/216; 428/195; 428/411.1; 428/484; 428/488.1; 428/488.4; 428/913; 428/914; 346/140 R

[58] Field of Search .......... 428/195, 488.4, 488.1, 428/484, 913, 914, 411.1, 216; 346/140

[56] References Cited

U.S. PATENT DOCUMENTS

| | | | |
|---|---|---|---|
| 4,528,242 | 7/1985 | Burwasser | 428/413 |
| 4,547,405 | 10/1985 | Bedell et al. | 427/256 |
| 4,555,437 | 11/1985 | Tanck | 428/212 |
| 4,575,465 | 3/1986 | Viola | 427/261 |
| 4,578,285 | 3/1986 | Viola | 427/209 |
| 4,592,954 | 6/1986 | Malhotra | 428/335 |
| 4,649,064 | 3/1987 | Jones | 427/256 |
| 4,732,815 | 3/1988 | Mizobuchi et al. | 428/484 |
| 4,778,729 | 10/1988 | Mizobuchi | 428/484 |
| 4,781,985 | 11/1988 | Desjarlais | 428/421 |
| 4,865,914 | 9/1989 | Malhotra | 428/331 |
| 4,875,961 | 10/1989 | Oike et al. | 156/234 |
| 4,887,097 | 10/1989 | Akiya et al. | 346/135.1 |
| 5,068,140 | 11/1991 | Malhotra et al. | 428/195 |

FOREIGN PATENT DOCUMENTS

| | | | |
|---|---|---|---|
| 62-278088 | 12/1987 | Japan | 428/216 |
| 63-315293 | 12/1988 | Japan | 428/216 |

*Primary Examiner*—Patrick J. Ryan
*Assistant Examiner*—Elizabeth Evans
*Attorney, Agent, or Firm*—Judith L. Byorick

[57] ABSTRACT

Disclosed is a recording sheet which comprises, in the order stated, an ink receiving layer, a base sheet, a heat absorbing layer, and an anticurl layer. The recording sheet can be transparent or opaque, and can be used in a wide variety of printing and imaging processes. The recording sheet exhibits little or no curling, even after exposure to heat and/or a wide range of relative humidities.

31 Claims, 1 Drawing Sheet

RECORDING SHEETS

BACKGROUND OF THE INVENTION

The present invention is directed to sheets suitable as receiving substrates in printing and imaging processes. More specifically, the present invention is directed to recording sheets suitable for printing and imaging processes which contain layers of heat resistant polymers. One embodiment of the present invention is directed to a recording sheet which comprises, in the order stated, an ink receiving layer, a base sheet, a heat absorbing layer, and an anticurl layer.

Recording sheets suitable for various printing and imaging processes are known. For example, U.S. Pat. No. 4,528,242 (Burwasser), the disclosure of which is totally incorporated herein by reference, discloses an ink jet recording transparency capable of absorbing colored, aqueous-miscible inks to provide permanent smear-resistant images. The transparency includes a transparent resinous support and a coating which is clear and comprises a mixture of a carboxylated polymer or copolymer having a molecular weight of about 50,000 to 1 million, and a polyalkylene glycol having an average molecular weight of about 5,000 to 25,000, with the glycol being present in an amount of about 5 to about 70 percent of the polymer.

In addition, U.S. Pat. No. 4,547,405 (Bedell et al.), the disclosure of which is totally incorporated herein by reference, discloses an ink jet recording sheet comprising a transparent support carrying a layer comprising 5 to 100 percent by weight of a coalesced block copolymer latex of polyvinyl alcohol with polyvinyl (benzyl ammonium chloride) and 0 to 95 percent by weight of a water soluble polymer selected from the group consisting of polyvinyl alcohol, polyvinyl pyrrolidone, and copolymers thereof.

Further, U.S. Pat. No. 4,555,437 (Tanck), the disclosure of which is totally incorporated herein by reference, discloses a transparent recording medium which comprises a conventional transparency base material coated with hydroxyethylcellulose and optionally containing one or more additional polymers compatible therewith.

Additionally, U.S. Pat. No. 4,575,465 (Viola), the disclosure of which is totally incorporated herein by reference, discloses an ink jet recording sheet comprising a transparent support carrying a layer comprising up to 50 percent by weight of vinylpyridine/vinylbenzyl quaternary salt copolymer and a hydrophilic polymer selected from the group consisting of gelatin, polyvinyl alcohol, and hydroxypropyl cellulose and mixtures thereof.

U.S. Pat. No. 4,578,285 (Viola), the disclosure of which is totally incorporated herein by reference, discloses a printing substrate adapted to receive ink droplets to form an image generated by an ink jet printer which comprises a transparent support carrying a layer comprising at least 70 percent by weight polyurethane and 5 to 30 percent by weight of a polymer selected from the group consisting of polyvinylpyrrolidone, polyvinylpyrrolidone/vinyl acetate copolymer, poly(ethyleneoxide), gelatin, and polyaccylic acid.

In addition, U.S. Pat. No. 4,592,954 (Malhotra), the disclosure of which is totally incorporated herein by reference, discloses a transparency for ink jet printing which comprises a supporting substrate and thereover a coating consisting essentially of a blend of carboxymethyl cellulose and polyethylene oxides. This patent also discloses papers for use in ink jet printing which comprise a plain paper substrate and a coating thereover consisting essentially of polyethylene oxides.

Further, U.S. Pat. No. 4,649,064 (Jones), the disclosure of which is totally incorporated herein by reference, discloses a rapid-drying image recording element adapted for water based liquid ink marking in devices such as pen plotters, ink printers and the like. The element comprises a support having thereon a hydrophilic ink receiving layer which is crosslinked to a degree sufficient to render it nonblocking and waterfast while permitting it to absorb rapidly a water-based liquid ink. The element is used in combination with a water-based liquid ink that comprises a water-dispersable crosslinkable colorant/resin composition and the ink receiving layer contains a crosslinking agent which crosslinks the colorant resin composition to render the markings smear resistant, abrasion resistant, and waterfast.

Additionally, U.S. Pat. No. 4,781,985 (Desjarlais), the disclosure of which is totally incorporated herein by reference, discloses an ink jet transparency which comprises a substantially transparent resinous support such as a polyester film and a substantially clear coating thereon which includes a specific fluorosurfactant.

U.S. Pat. No. 4,887,097 (Akiya et al.), the disclosure of which is totally incorporated herein by reference, discloses a recording medium having a substrate and an ink receiving layer provided on the substrate, wherein the ink receiving layer contains, in combination, solvent soluble resin (A) that is capable of absorbing water in an amount of 0.5 times or more as much as its own weight and is substantially water insoluble, and particles of solvent insoluble resin (B) that is capable of absorbing water in an amount of 50 times or more as much as its own weight.

In addition, U.S. Pat. No. 4,865,914 (Malhotra), the disclosure of which is totally incorporated herein by reference, discloses a transparency which comprises a supporting substrate and a blend which comprises polyethylene oxide and carboxymethyl cellulose together with a component selected from the group consisting of (1) hydroxypropyl cellulose; (2) vinylmethyl ether/-maleic acid copolymer; (3) carboxymethyl hydroxyethyl cellulose; (4) hydroxyethyl cellulose; (5) acrylamide/acrylic acid copolymer; (6) cellulose sulfate; (7) poly(2-acrylamido-2-methyl propane sulfonic acid); (8) poly(vinyl alcohol); (9) poly(vinyl pyrrolidone); and (10) hydroxypropyl methyl cellulose. Papers with these coatings are also disclosed.

Additional disclosures concerning recording sheets are disclosed in, for example, U.S. Pat. No. 3,535,112, U.S. Pat. No. 3,539,340, U.S. Pat. No. 4,071,362, U.S. Pat. No. 4,085,245, U.S. Pat. No. 4,259,422, U.S. Pat. No. 4,489,122, U.S. Pat. No. 4,526,847, U.S. Pat. No. 4,547,405, U.S. Pat. No. 4,575,465, U.S. Pat. No. 4,770,934, U.S. Pat. No. 4,865,914, U.S. Pat. No. 3,488,189, U.S. Pat. No. 3,493,412, U.S. Pat. No. 3,619,279, U.S. Pat. No. 3,539,341, U.S. Pat. No. 3,833,293, U.S. Pat. No. 3,854,942, U.S. Pat. No. 4,234,644, U.S. Pat. No. 4,419,004, U.S. Pat. No. 4,419,005, U.S. Pat. No. 4,480,003, U.S. Pat. No. 4,711,816, U.S. Pat. No. 4,637,974, U.S. Pat. No. 4,370,379, U.S. Pat. No. 4,599,293, U.S. Pat. No. 4,466,174, U.S. Pat. No. 4,371,582, U.S. Pat. No. 4,680,235, U.S. Pat. No. 4,775,594, U.S. Pat. No. 4,474,850, U.S. Pat. No. 4,592,954, U.S. Pat. No.

4,503,111, U.S. Pat. No. 4,650,714, U.S. Pat. No. 4,732,786, U.S. Pat. No. 4,308,542, U.S. Pat. No. 4,269,891, U.S. Pat. No. 4,371,582, U.S. Pat. No. 4,301,195, U.S. Pat. No. 4,578,285, U.S. Pat. No. 4,555,437, U.S. Pat. No. 4,711,816, U.S. Pat. No. 4,781,985, U.S. Pat. No. 4,686,118, U.S. Pat. No. 4,701,837, U.S. Pat. No. 3,320,089, U.S. Pat. No. 3,841,903, U.S. Pat. No. 4,770,934, and U.S. Pat. No. 4,830,911, the disclosures of each of which are totally incorporated herein by reference.

Heat resistant coating materials are also known. For example, U.S. Pat. No. 4,732,815 (Mizobuchi et al.) and U.S. Pat. No. 4,778,729 (Mizobuchi), the disclosures of each of which are totally incorporated herein by reference, disclose a heat transfer sheet comprising a base film and a hot melt ink layer formed on one surface of the base film, said hot melt ink layer comprising one or more components which impart filling to the printed areas of a transferable paper during transferring. Another type of heat transfer sheet comprising a base film, a hot melt ink layer laminated on one surface of the base film, and a filling layer laminated on the hot melt ink layer is also disclosed. The sheet can have a backing layer of a heat resistant antistick polymer such as silicone-modified acrylic resins, silicone-modified polyester resins, vinylidene fluoride resins, and the like.

In addition, U.S. Pat. No. 4,875,961 (Oike et al.), the disclosure of which is totally incorporated herein by reference, discloses a heat sensitive transfer medium comprising a support and a transfer layer comprising at least a nonflowable ink layer and an adhesive layer, said two layers being provided in that order from the support side. The transfer medium can have a backing layer of a material such as a fluorine containing polymer.

U.S. Pat. No. 5,068,140 (Malhotra et al.), the disclosure of which is totally incorporated herein by reference, discloses a transparency which comprises a hydrophilic coating and a plasticizer such as a phosphate, a substituted phthalic anhydride, a glycerol, a glycol, a substituted glycerol, a pyrrolidinone, an alkylene carbonate, a sulfolane, or a stearic acid derivative. Papers having the disclosed coatings are also included in the disclosure.

U.S. Pat. No. 5,068,140 (Malhotra et al.), the disclosure of which is totally incorporated herein by reference, discloses a transparent substrate material for receiving or containing an image which comprises a supporting substrate, an anticurl coating layer or coatings thereunder and an ink receiving layer thereover.

U.S. Pat. No. 4,956,225 (Malhotra), the disclosure of which is totally incorporated herein by reference, discloses transparencies suitable for electrographic and xerographic imaging which comprise a polymeric substrate with a toner receptive coating on one surface comprising blends of: poly(ethylene oxide) and carboxymethyl cellulose; poly(ethylene oxide), carboxymethyl cellulose and hydroxypropyl cellulose; poly(ethylene oxide) and vinylidene fluoride/hexafluoropropylene copolymer, poly(chloroprene) and poly(α-methylstyrene); poly(caprolactone) and poly(α-methylstyrene); poly(vinylisobutylether) and poly(α-methylstyrene); blends of poly(caprolactone) and poly(p-isopropyl α-methylstyrene); blends of poly(1,4-butylene adipate) and poly(α-methylstyrene); chlorinated poly(propylene) and poly(α-methylstyrene); chlorinated poly(ethylene) and poly(α-methylstyrene); and chlorinated rubber and poly(α-methylstyrene). This copending application also discloses transparencies suitable for electrographic and xerographic imaging processes comprising a supporting polymeric substrate with a toner receptive coating on one surface thereof which comprises: (a) a first layer coating of a crystalline polymer selected from the group consisting of poly(chloroprene), chlorinated rubbers, blends of poly(ethylene oxide), and vinylidene fluoride/hexafluoropropylene copolymers, chlorinated poly(propylene), chlorinated poly(ethylene), poly(vinylmethyl ketone), poly(caprolactone), poly(1,4-butylene adipate), poly(vinylmethyl ether), and poly(vinyl isobutylether); and (b) a second overcoating layer comprising a cellulose ether selected from the group consisting of hydroxypropyl methyl cellulose, hydroxypropyl cellulose and ethyl cellulose.

U.S. Pat. No. 4,997,697 (Malhotra), the disclosure of which is totally incorporated herein by reference, discloses a transparent substrate material for receiving or containing an image which comprises a supporting substrate base, an antistatic polymer layer coated on one or both sides of the substrate and comprising hydrophilic cellulosic components, and a toner receiving polymer layer contained on one or both sides of the antistatic layer, which polymer comprises hydrophobic cellulose ethers, hydrophobic cellulose esters or mixtures thereof, and wherein the toner receiving layer contains adhesive components.

Copending application U.S. Ser. No. 07/370,677 (Malhotra), filed Jun. 23, 1989, the disclosure of which is totally incorporated herein by reference, discloses an imaged transparency comprising a supporting substrate, an oil absorbing layer which comprises, for example, chlorinated rubber, styrene-olefin copolymers, alkylmethacrylate copolymers, ethylene-propylene copolymers, sodium carboxymethyl cellulose or sodium carboxymethylhydroxyethyl cellulose, and ink receiving polymer layers comprising, for example, vinyl alcohol-vinyl acetate, vinyl alcohol-vinyl butyral or vinyl alcohol-vinyl acetate-vinyl chloride copolymers. The ink receiving layers may include therein or thereon fillers such as silica, calcium carbonate, or titanium dioxide.

U.S. Pat. No. 5,075,153 (Malhotra), the disclosure of which is totally incorporated herein by reference, discloses a never-tear coated paper comprising a plastic supporting substrate; a binder layer comprising polymers selected from the group consisting of (1) hydroxy propyl cellulose, (2) poly(vinyl alkyl ether), (3) vinyl pyrrolidone-vinyl acetate copolymer, (4) vinyl pyrrolidone-dialkylamino ethyl methacrylate copolymer quaternized, (5) poly(vinyl pyrrolidone), (6) poly(ethylene imine), and mixtures thereof; a pigment or pigments; and an ink receiving polymer layer.

Copending application U.S. Ser. No. 07/587,781 (Malhotra), filed Mar. 2, 1990, the disclosure of which is totally incorporated herein by reference, discloses all purpose xerographic transparencies with coatings thereover which are compatible with the toner compositions selected for development, and wherein the coatings enable images with acceptable optical densities. One disclosed transparency for ink jet printing processes and xerographic printing processes comprises a supporting substrate and a coating composition thereon which comprises a mixture selected from the classes of materials comprising (a) nonionic celluloses such as hydroxylpropylmethyl cellulose, hydroxyethyl cellulose, hydroxybutyl methyl cellulose, or mixtures thereof; (b) ionic celluloses such as anionic sodium carboxymethyl cellulose, anionic sodium carboxymethyl hydroxyethyl cellulose, cationic celluloses, or mixtures thereof; (c) poly(alkylene oxide) such as poly(ethylene oxide) together with a noncellulosic component selected from the group consisting of (1) poly(imidazoline) quaternized; (2) poly(N,N-dimethyl-3,5-dimethylene piperidinium chloride); (3) poly(2-acrylamido-2-methyl propane sulfonic acid); (4) poly(ethylene imine) epichlorohydrin; (5) poly(acrylamide); (6) acrylamide-acrylic acid copolymer; (7) poly(vinyl pyrrolidone); (8) poly(vinyl alcohol); (9) vinyl pyrrolidone-diethyl aminomethylmethacrylate copolymer quaternized; (10) vinyl pyrrolidonevinyl acetate copolymer; and mixtures thereof. The coating compositions are generally present on both sides of a supporting substrate, and in one embodiment the coating comprises nonionic hydroxyethyl cellulose, 25 percent by weight, anionic sodium carboxymethyl cellulose, 25 percent by weight, poly(ethylene oxide), 25 percent by weight, and poly(acrylamide), 25 percent by weight. The coating can also contain colloidal silica particles, a carbonate, such as calcium carbonate, and the like primarily for the purpose of transparency traction during the feeding process.

Copending application U.S. Ser. No. 07/544,577 (Malhotra), filed Jun. 27, 1990, the disclosure of which is totally incorporated herein by reference, discloses transparencies for electrophotographic processes, especially xerographic processes, ink jet printing processes, dot matrix printing processes and the like, comprising a supporting substrate and an ink or toner receiving coating composition on both sides of the substrate comprising an adhesive layer polymer such as chlorinated poly(isoprene), chlorinated poly(propylene), blends of phosphate esters with poly(styrene) and the like and an antistatic layer on both sides of the adhesive layer, which antistatic layer comprises complexes of metal halides such as potassium iodide, urea compounds such as urea phosphate with polymers containing oxyalkylene units such as poly(ethylene oxide), poly (propylene oxide), ethylene oxide/propylene oxide block copolymers, ethoxylated amines and the like, and an optional resin binder polymer such as poly(2-hydroxyethylmethacrylate), poly(2-hydroxypropylmethacrylate), hydroxypropylmethyl cellulose, or the like.

Although known recording sheets are suitable for their intended purposes, a need remains for recording sheets that do not exhibit curling and which retain their anticurl characteristics after exposure to heat. Known recording sheets, such as the transparency sheets disclosed in, for example, U.S. Pat. No. 4,592,954 and U.S. Pat. No. 4,865,914, generally comprise ink receiving coatings or layers on a base sheet. Frequently, the ink receiving layer is present on the base sheet in a coating weight of, for example, from about 8.0 to about 20.0 grams per square meter, and the layer frequently is present only on one side of the base sheet. These heavy coating weights can result in curling problems with the recording sheets, particularly when the sheets are transparencies used for projection of images. One possible method of avoiding the curling problem is to coat both surfaces of the base sheet with the ink receiving layer. Recording sheets bearing ink receiving layers on both surfaces, however, can present difficulties during stacking of the sheets, wherein an ink image is transferred from the printed surface of one recording sheet to the printed or nonprinted surface of another recording sheet. Another possible method of avoiding curling problems is to provide a recording sheet with a two-layered anticurl back layer, as disclosed in copending application U.S. Ser. No. 07/388,449. Recording sheets of this configuration perform well under all humidities at 80° F. temperatures in printers that do not use heaters for fast drying of the ink images. When employed in printers equipped with heaters, however, these recording sheets may exhibit curling problems as a result of loss of moisture caused by the heating. Accordingly, there is a need for recording sheets that do not exhibit curl upon exposure to a wide range of relative humidities and do not curl subsequent to being subjected to heat.

SUMMARY OF THE INVENTION

It is an object of the present invention to provide recording sheets suitable for printing and imaging applications.

It is another object of the present invention to provide recording sheets that do not curl upon exposure to a wide range of relative humidities.

It is another object of the present invention to provide recording sheets that do not curl subsequent to exposure to heat.

It is yet another object of the present invention to provide recording sheets that enable the formation of high quality color images thereon.

Another object of the present invention is to provide recording sheets compatible with printing processes wherein heat is applied to the recording sheet.

Yet another object of the present invention is to provide recording sheets that enable the formation of images of high optical density thereon.

Still another object of the present invention is to provide recording sheets that can be imaged and then stacked together with little or no transfer of images from one sheet to adjacent sheets.

It is another object of the present invention to provide recording sheets for which curl is minimized or eliminated.

It is yet another object of the present invention to provide recording sheets which, when printed with inks of more than one color, exhibit good mixing of primary colors to generate high quality secondary colors.

It is still another object of the present invention to provide recording sheets which, when printed with inks of more than one color, exhibit little or no bleeding of colors.

Another object of the present invention is to provide recording sheets that are substantially transparent.

Yet another object of the present invention is to provide recording sheets that are opaque, such as coated papers, coated opaque polymeric base sheets, and the like.

Still another object of the present invention is to provide recording sheets that enable the formation of substantially permanent images thereon.

It is another object of the present invention to provide recording sheets suitable for use in ink jet printing processes.

It is yet another object of the present invention to provide recording sheets suitable for use in electrophotographic, ionographic, and electrographic imaging processes.

It is still another object of the present invention to provide recording sheets that avoid or minimize jamming when fed along the paper path of a printing or imaging device, particularly at fuser rolls in electrophotographic, ionographic, or electrographic imaging devices.

These and other objects of the present invention (or specific embodiments thereof) can be achieved by providing a recording sheet which comprises, in the order stated, an ink receiving layer, a base sheet, a heat absorbing layer, and an anticurl layer. Another embodiment of the present invention is directed to a recording sheet which comprises, in the order stated, an ink receiving layer, a first heat absorbing layer, a base sheet, a second heat absorbing layer, and an anticurl layer. Yet another embodiment of the present invention is directed to a process which comprises applying a recording liquid to a recording sheet of the present invention in an imagewise pattern. Still another embodiment of the present invention is directed to a printing process which comprises (1) incorporating into an ink jet printing apparatus containing an ink a recording sheet of the present invention and causing droplets of the ink to be ejected in an imagewise pattern onto the recording sheet, thereby generating images on the recording sheet. Another embodiment of the present invention is directed to a process for generating images which comprises generating an electrostatic latent image on an imaging member in an imaging apparatus, developing the latent image with a toner, transferring the developed image to a recording sheet of the present invention, and optionally permanently affixing the transferred image to the recording sheet. Yet another embodiment of the present invention is directed to an imaging process which comprises generating an electrostatic latent image on a recording sheet of the present invention, developing the latent image with a toner, and optionally permanently affixing the developed image to the recording sheet.

DETAILED DESCRIPTION OF PREFERRED EMBODIMENTS

Figure 1:
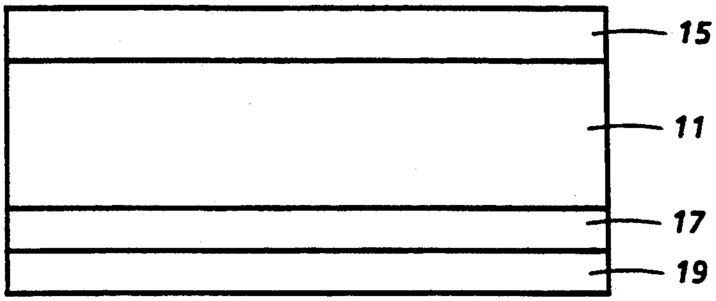
FIG. 1 illustrates schematically in cross section one embodiment of the recording sheet of the present invention comprising a base sheet having an ink receptive layer on one surface and a heat absorbing layer and an anticurl layer on the other surface.

Illustrated schematically in FIG. 1 is one embodiment of the recording sheet of the present invention which comprises a base sheet 11 with an ink receiving layer 15 on one surface and, on the other surface, a heat absorbing layer 17 in contact with base sheet 11 and an anticurl layer 19 coated onto heat absorbing layer 17.

Figure 2:
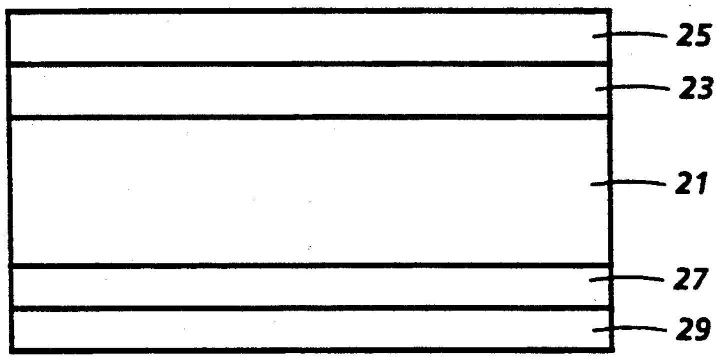
FIG. 2 illustrates schematically in cross section another embodiment of the recording sheet of the present invention comprising a base sheet having a heat absorbing layer and an ink receptive layer on one surface and a heat absorbing layer and an anticurl layer on the other surface.

Illustrated schematically in FIG. 2 is another embodiment of the recording sheet of the present invention which comprises a base sheet 21 coated on one surface with a first heat absorbing layer 23. First heat absorbing layer 23 is coated with ink receiving layer 25. The opposite surface of base sheet 21 is coated with second heat absorbing layer 27, and second heat absorbing layer 27 is coated with an anticurl layer 29.

The base sheet for the recording sheets of the present invention can be any suitable material for receiving images. Examples include transparent materials, such as polyester, including Mylar TM , available from E.I. Du Pont de Nemours & Company, Melinex TM , available from Imperial Chemicals, Inc., Celanar TM , available from Celanese Corporation, polycarbonates such as Lexan TM , available from General Electric Company, polysulfones, cellulose triacetate, polyvinylchloride cellophane, polyvinyl fluoride, and the like, with polyester such as Mylar TM being preferred in view of its availability and relatively low cost. The base sheet can also be opaque, such as paper, including plain papers such as Xerox ® 4024, diazo papers, or the like, or opaque plastics and filled polymers, such as Melinex ®, available from ICI. The base sheet can be of any effective thickness. Typical thicknesses for the base sheet are from about 50 to about 125 microns, and preferably from about 100 to about 125 microns.

The ink receiving layer or layers of the recording sheets of the present invention are selected to be compatible with the material from which images will be formed on the recording sheet. For example, when the recording sheet is intended for use in ink jet printing processes, the ink receiving layer or layers are of a material that will enable formation of high quality images with the ink used in the process, which typically is an aqueous based ink. When the recording sheet is intended for use in electrophotographic, ionographic, or electrographic printing processes, the ink receiving layer or layers are of a material compatible with the toner employed to develop the images, which may be either a dry toner or a liquid toner, and which typically is hydrophobic. Examples of coating materials suitable for recording sheets for printing processes employing aqueous based inks include hydrophilic materials, such as binary blends comprising poly(ethylene oxide), such as POLYOX TM WSRN-3000, available from Union Carbide Company, preferably in an amount of from about 10 to about 90 percent by weight, and a component, preferably in an amount of from about 10 to about 90 percent by weight, selected from the group consisting of: (1) hydroxypropyl methyl cellulose, such as Methocel TM K35LV, available from Dow Chemical Company; (2) vinylmethyl ether/maleic acid copolymers, such as Gantrez TM S-95, available from GAF Corporation; (3) acrylamide/acrylic acid copolymers, available from Scientific Polymer Products; (4) salts of carboxymethylhydroxyethyl cellulose, such as sodium carboxymethylhydroxyethyl cellulose, such as CMHEC43H TM and 37L TM , available from Hercules Chemical Company (CMHEC 43H TM is believed to be a high molecular weight polymer with carboxymethyl cellulose (CMC/hydroxyethyl cellulose (HEC) ratio of 4:3, CMHEC 37L TM is believed to be a low molecular weight polymer with CMC/HEC ratio of 3:7); (5) hydroxyethyl cellulose, such as Natrosol 250LR, available from Hercules; (6) water soluble ethylhydroxyethyl cellulose, such as Bermocoll TM , available from Berol Kem, AB, Sweden; (7) cellulose sulfate, available from Scientific Polymer Products; (8) poly(vinyl alcohol), available from Scientific Polymer Products; (9) poly(vinyl pyrrolidone), available from GAF Corporation; (10) hydroxybutylmethyl cellulose, available from Dow Chemical Company; (11) hydroxypropyl cellulose, such as Klucel TM Type E, available from Hercules; (12) poly(2-acrylamido-2-methyl propane sulfonic acid, available from Scientific Polymer Products); (13) methyl cellulose, available from Dow Chemical Company; (14) hydroxyethylmethyl cellulose, such as HEM, available from British Celanese Ltd., and Tylose MH, MHK from Kalle A.G.; (15) cellulose acetate, available from Scientific Polymer Products; (16) cellulose acetate hydrogen phthalate, such as CAP, available from Eastman Kodak Company; (17) hydroxypropylmethyl cellulose phthalate, such as HPMCP, available from Shin-Etsu Chemical; (18) vinylalcohol/vinylacetate copolymers, available from Scientific Polymer Products; (19) vinylalcohol/vinylbutyral copolymers, available from Scientific Polymer Products; (20) salts of carboxymethyl cellulose, such as sodium carboxymethyl cellulose, such as CMC Type 7HOF, available from Hercules Chemical Company; and (21) vinyl pyrrolidone/vinyl acetate copolymers, available from Scientific Polymer Products. Also suitable are ternary blends comprising poly(ethylene oxide), preferably in an amount of from about 10 to about 50 percent by weight, salts of carboxymethyl cellulose, such as sodium carboxymethyl cellulose, preferably in an amount of from about 5 to about 85 percent by weight, and a component, preferably in an amount of from about 5 to about 45 percent by weight, selected from the group consisting of (1) hydroxypropyl methyl cellulose, such as Methocel™ K35LV, available from Dow Chemical Company; (2) vinylmethyl ether/maleic acid copolymers, such as Gantrez™ S-95, available from GAF Corporation; (3) acrylamide/acrylic acid copolymers, available from Scientific Polymer Products; (4) salts of carboxymethylhydroxyethyl cellulose, such as sodium carboxymethylhydroxyethyl cellulose, such as CMHEC43H™, 37L, available from Hercules Chemical Company; (5) hydroxyethyl cellulose, such as Natrosol™ 250LR, available from Hercules; (6) water soluble ethylhydroxyethyl cellulose, such as Bermocoll™, available from Berol Kem, AB, Sweden; (7) cellulose sulfate, available from Scientific Polymer Products; (8) poly(vinyl alcohol), available from Scientific Polymer Products; (9) poly(vinyl pyrrolidone), available from GAF Corporation; (10) hydroxybutylmethyl cellulose, available from Dow Chemical Company; (11) hydroxypropyl cellulose, such as Klucel™ Type E, available from Hercules; (12) poly(2-acrylamido-2-methyl propane sulfonic acid), available from Scientific Polymer Products; (13) methyl cellulose, available from Dow Chemical Company; (14) hydroxyethylmethyl cellulose, such as HEM available from British Celanese Ltd., and Tylose™ MH, MHK from Kalle A.G.; (15) poly(diethylene triamine-co-adipic acid), available from Scientific Polymer Products; (16) poly(imidazoline) quaternized, available from Scientific Polymer Products; (17) poly(ethylene imine) epichlorohydrin modified, available from Scientific Polymer Products; (18) poly(N,Ndimethyl-3,5-dimethylene piperidinium chloride), available from Scientific Polymer Products, and (19) poly(ethylene imine) ethoxylated, available from Scientific Polymer Products. Also suitable are ternary blends of poly(ethylene oxide), preferably in an amount of from about 10 to about 50 percent by weight, hydroxyalkylmethyl cellulose (wherein the alkyl group generally has from 1 to about 10 carbon atoms, such as ethyl, propyl or butyl), preferably in an amount of from about 5 to about 85 percent by weight, and a component, preferably in an amount of from about 5 to about 45 percent by weight, selected from the group consisting of (1) hydroxypropyl cellulose, such as Klucel™ Type E, available from Hercules; (2) vinylmethyl ether/maleic acid copolymers, such as Gantrez™ S-95, available from GAF Corporation; (3) acrylamide/acrylic acid copolymers, available from Scientific Polymer Products, (4) salts of carboxymethylhydroxyethyl cellulose, such as sodium carboxymethylhydroxyethyl cellulose, such as CMHEC43H™, 37L, available from Hercules Chemical Company; (5) hydroxyethyl cellulose, such as Natrosol 250LR, available from Hercules Chemical Company; (6) water soluble ethylhydroxyethyl cellulose, such as Bermocoll™, available from Berol Kem, AB, Sweden; (7) cellulose sulfate, available from Scientific Polymer Products; (8) poly(vinyl alcohol), available from Scientific Polymer Products; (9poly(vinyl pyrrolidone), available from GAF Corporation; (10) poly(2-acrylamido-2-methyl propane sulfonic acid), available from Scientific Polymer Products; (11) methyl cellulose, available from Dow Chemical Company; (12) salts of carboxymethyl cellulose, such as sodium carboxymethyl cellulose, such as CMC 7HOF™, available from Hercules Chemical Company; (13) poly(diethylene triamine-co-adipic acid), available from Scientific Polymer Products; (14) poly(imidazoline) quaternized available from Scientific Polymer Products; (15) poly(ethylene imine) epichlorohydrin modified, available from Scientific Polymer Products; (16) poly(N,N-dimethyl-3,5-dimethylene piperidinium chloride), available from Scientific Polymer Products; and (17) poly(ethylene imine) ethoxylated, available from Scientific Polymer Products.

Illustrative specific examples of binary (two polymers) and ternary (three polymers) blends suitable as ink receiving layers for printing processes employing aqueous based inks include binary blends of hydroxyethylmethyl cellulose, 75 percent by weight, and poly(ethylene oxide), 25 percent by weight; binary blends of hydroxypropylmethyl cellulose, 80 percent by weight, and poly(ethylene oxide), 20 percent by weight; binary blends of hydroxybutylmethyl cellulose, 70 percent by weight, and poly(ethylene oxide), 30 percent by weight; binary blends of sodium carboxymethyl cellulose, 80 percent by weight, and poly(ethylene oxide), 20 percent by weight; ternary blends of hydroxyalkylmethyl cellulose, 50 percent by weight, sodium carboxymethyl cellulose, 25 percent by weight, and poly(ethylene oxide), 25 percent by weight; ternary blends of hydroxyalkylmethyl cellulose, 60 percent by weight, poly(ethylene oxide), 20 percent by weight, and poly(N,N-dimethyl-3,5-dimethylene piperidinium chloride), 20 percent by weight; and ternary blends of hydroxypropylmethyl cellulose, 50 percent by weight, poly(ethylene oxide), 25 percent by weight, and sodium carboxymethyl cellulose, 25 percent by weight, and the like. Binary blends of hydroxypropylmethyl cellulose, 80 percent by weight, and poly(ethylene oxide), 20 percent by weight, are preferred in some embodiments as these yield images of high optical density (when, for example imaged in Xerox® 4020™ ink jet printers), such as 1.15 (black), 1.44 (magenta), 0.84 (cyan) and 0.57 (yellow), which images are resistant to humidity, for example between 20 to 80 percent humidity at 80° F. Further examples of coating materials compatible with aqueous based inks are disclosed in, for example, U.S. Pat. No. 4,528,242, U.S. Pat. No. 4,547,405, U.S. Pat. No. 4,555,437, U.S. Pat. No. 4,575,465, U.S. Pat. No. 4,578,285, U.S. Pat. No. 4,592,954, U.S. Pat. No. 4,649,064, U.S. Pat. No. 4,781,985, U.S. Pat. No. 4,887,097, U.S. Pat. No. 4,474,850, U.S. Pat. No. 4,650,714, U.S. Pat. No. 4,732,786, U.S. Pat. No. 4,775,594, U.S. Pat. No. 4,308,542, U.S. Pat. No. 4,269,891, U.S. Pat. No. 4,371,582, U.S. Pat. No. 4,301,195, U.S. Pat. No. 4,503,111, U.S. Pat. No. 4,686,118, U.S. Pat. No. 4,701,837, U.S. Pat. No.

4,770,934, U.S. Pat. No. 4,466,174, U.S. Pat. No. 4,371,582, U.S. Pat. No. 4,680,235, U.S. Pat. No. 4,711,816, and U.S. Pat. No. 4,830,911, the disclosures of each of which are totally incorporated herein by reference.

Examples of coating materials suitable for recording sheets for electrophotographic, ionographic, or electrographic imaging processes employing dry or liquid toners include hydrophobic materials, such as blends of poly(α-methyl styrene) (molecular weight M between $10^3$ and $10^5$, available from Amoco as resin 18-290), preferably in an amount of from about 5 to about 95 percent by weight, and a component, preferably in an amount of from about 5 to about 95 percent by weight, selected from the group consisting of (1) poly(ethylene oxide), such as POLY OX-WSRN TM 3000, available from Union Carbide Company; (2) halogenated (such as chlorinated, brominated, fluorinated, iodated, or the like) rubber, such as a rubber with a chlorine content of about 65 percent, available from Scientific Polymer Products; (3) halogenated (such as chlorinated, brominated, fluorinated, iodated, or the like) poly(propylene), such as a polypropylene with a chlorine content of about 65 percent by weight, available from Scientific Polymer Products; (4) halogenated (such as chlorinated, brominated, fluorinated, iodated, or the like) poly(ethylene), such as a polyethylene with a chlorine content of about 48 percent by weight, available from Scientific Polymer Products; (5) poly(caprolactone), such as PLC-700 TM, available from Union Carbide Company; (6) poly(chloroprene), available from Scientific Polymer Products; (7) poly(1,4-butylene adipate), available from Scientific Polymer Products; (8) poly(-vinylmethylether), such as Lutonal TM M-40, available from BASF; (9) poly(vinylisobutylether), such as Lutonal TM 160, available from BASF; (10) styrene-butadiene copolymers, such as Kraton TM 1102 and Kraton TM 1652, available from Shell Company; and (11) ethyl cellulose, such as Ethocel TM Type-N, available from Hercules Chemical Company. Specific examples of binary blends suitable as toner or ink receiving layer materials for electrophotographic, ionographic, or electrographic imaging include blends of poly(α-methyl styrene) in an amount of about 80 percent by weight and poly(chloroprene) in an amount of about 20 ; percent by weight; blends of chlorinated rubber in an amount of about 80 percent by weight and poly(α-methyl styrene) in an amount of about 20 percent by weight; blends of poly(α-methyl styrene) in an amount of about 20 percent by weight and styrene-butadiene copolymer in an amount of about 80 percent by weight; and blends of poly(α-methyl styrene) in an amount of about 20 percent by weight and ethyl cellulose in an amount of about 80 percent by weight. Blends of poly(α-methyl styrene) with chloroprene or ethyl cellulose or chlorinated rubber are often preferred, as recording sheets coated with these polymers and imaged with a Xerox ® 1005 TM color copier yield high optical density images of, for example, 1.6 (black), 1.40 (magenta), 1.50 (cyan), and 0.80 (yellow), which could not be lifted off with 3M scotch tape 60 seconds subsequent to their preparation. Further examples of coating materials compatible with dry and liquid toners are disclosed in, for example, U.S. Pat. No. 3,320,089, U.S. Pat. No. 3,488,189, U.S. Pat. No. 3,493,412, U.S. Pat. No. 3,535,112, U.S. Pat. No. 3,539,340, U.S. Pat. No. 3,539,341, U.S. Pat. No. 3,619,279, U.S. Pat. No. 3,833,293, U.S. Pat. No. 3,841,903, U.S. Pat. No. 3,854,942, U.S. Pat. No. 4,071,362, U.S. Pat. No. 4,085,245, U.S. Pat. No. 4,234,644, U.S. Pat. No. 4,259,422, U.S. Pat. No. 4,370,379, U.S. Pat. No. 4,419,004, U.S. Pat. No. 4,419,005, U.S. Pat. No. 4,480,003, U.S. Pat. No. 4,489,122, U.S. Pat. No. 4,526,847, and U.S. Pat. No. 4,599,293, the disclosures of each of which are totally incorporated herein by reference.

The ink receiving layer or layers can be of any effective thickness. Typical thicknesses are from about 1 to about 25 microns, and preferably from about 5 to about 15 microns. In addition, the ink receiving layer can optionally contain filler materials, such as inorganic oxides, including silicon dioxide, titanium dioxide (rutile), and the like, colloidal silicas, such as Syloid TM 74 available from W. R. Grace & Company, calcium carbonate, or the like, as well as mixtures thereof, in any effective amount. Typical amounts of fillers are from about 1 to about 25 percent by weight of the coating composition, and preferably from about 2 to about 10 percent by weight of the coating composition. When it is desired that the recording sheet of the present invention be transparent, the filler typically is present in an amount of up to about 3 percent by weight. Filler components may be useful as a slip component for feeding the recording sheet through a printing or imaging apparatus, since addition of the filler renders the sheet surface discontinuous, thereby imparting roughness to the surface and making it easy to grip in a machine equipped with pinch rollers. In addition, fillers such as silica can enhance color mixing when primary colors are mixed to form secondary colors, particularly in ink jet printing processes.

The heat absorbing layer or layers of the recording sheets of the present invention is of a material capable of absorbing or dissipating heat applied to the recording sheet. Specific examples of materials suitable for the recording sheets of the present invention include: (1) vinylidene fluoride/hexafluoropropylene copolymers, such as Viton TM E-45, available from E. I. Du Pont de Nemours & Company, or Fluorel TM, available from 3M Company; (2) vinylidene fluoride/hexafluoro propylene/tetrafluoroethylene copolymers, such as Viton TM B, available from E. I. Du Pont de Nemours & Company; (3) vinylidene fluoride/tetrafluoroethylene/perfluoro methylvinyl ether terpolymers, such as Viton TM GLT and Kalrez TM, available from E. I. Du Pont de Nemours & Company; (4) tetrafluoro propylene/propylene copolymers, such as Aftal TM, available from Asahi Glass Company; (5) vinylidene fluoride/chloro trifluoroethylene copolymers, such as Kel-F TM, available from 3M Company; (6) tetrafluoroethylene/ethylene copolymers, such as Tefzel-200 TM and HT-2004 TM available from E. I. Du Pont de Nemours & Company; (7) tetrafluoroethylene/hexafluoropropylene copolymers, such as Teflon TM FEP-140, available from E. I. Du Pont de Nemours & Company; (8) poly(vinyl fluoride), such as Tedlar TM resin and Tedlar TM PVF film, available from E. I. Du Pont de Nemours & Company (9) poly(vinylidene fluoride), such as Kynar TM, available from Pennwalt Corporation; (10) styrene-b-isoprene-b-dimethylsiloxane triblock copolymers, preferably with a styrene content of about 50 percent by weight, isoprene content of about 30 percent by weight and dimethylsiloxane content of about 20 percent by weight (synthesized via sequential addition anionic polymerization of styrene with n-butyl lithium and initiator followed by addition of isoprene and octamethyl cyclotetrasiloxane, and quenching the reaction with methanol); (11) dimethyl siloxane-b-bisphenol A carbonate diblock copolymers, such as #789, available from Scientific Polymer Products; (12) dimethylsiloxane-b-α-methyl styrene diblock copolymers, such as #790, available from Scientific Polymer Products; (13) poly(sulfone), such as #046, available from Scientific Polymer Products; (14) poly(sulfide), such as #588, available from Scientific Polymer Products; (15) chlorosulfonated poly(ethylene), such as #107, available from Scientific Polymer Products; (16) acrylonitrile/butadiene copolymers, such as #055, available from Scientific Polymer Products; (17) acrylonitrile/-butadiene/styrene terpolymers, such as #051, available from Scientific Polymer Products; (18) styrene/butadiene copolymers, such as Kraton™ 1102 and Kraton™ 1652, available from Shell Company, (19) styrene/isoprene diblock copolymers, preferably with a molecular weight of about $1.0 \times 10^5$ and preferably with a styrene content of about 50 percent by weight (synthesized via anionic sequential addition polymerization of styrene followed by addition of isoprene, n-butyl lithium being the initiator and methanol as the terminator); (20) isobutylene/isoprene halogenated (such as brominated, chlorinated, or the like) copolymers, such as #649, available from Scientific Polymer Products; (21) ethylene/propylene rubber, such as #358, available from Scientific Polymer Products; (22) ethylene/ethylacrylate copolymers, such as #455, available from Scientific Polymer Products; (23) ethylene/propylene/-diene terpolymers, such as #359, available from Scientific Polymer Products; (24) ethylene/vinyl acetate copolymers, such as #786, available from Scientific Polymer Products; and (25) ethylene/maleic anhydride copolymers, such as #197, available from Scientific Polymer Products.

Specific examples of heat absorbing or dissipating materials include fluorine containing polymers such as vinylidene fluoride/hexafluoropropylene copolymers with from about 10 to about 40 percent by weight of hexafluoropropylene; tetrafluoroethylene/hexafluoropropylene random copolymers with from about 10 to about 50 percent by weight of hexafluoropropylene; vinylidene fluoride/hexafluoro propylene/tetrafluoroethylene terpolymers with from about 10 to about 60 percent by weight of hexafluoro propylene, from about 40 to about 10 percent by weight of vinylidene fluoride, and from about 30 to about 50 percent by weight of tetrafluoroethylene; vinylidene fluoride/hexafluoro propylene/tetrafluoroethylene terpolymers with from about 10 to about 60 percent by weight of hexafluoro propylene, from about 10 to about 40 percent by weight of vinylidene fluoride, and from about 30 to about 50 percent by weight of tetrafluoroethylene; vinylidene fluoride/tetrafluoroethylene/perfluoromethyl vinyl ether terpolymers with from about 10 to about 60 percent by weight of vinylidene fluoride, from about 30 to about 50 percent by weight of tetrafluoroethylene, and from about 10 to about 40 percent by weight of perfluoromethylvinyl ether; tetrafluoroethylene/propylene copolymers with a propylene content of from about 10 to about 60 percent by weight; vinylidene fluoride/chlorotrifluoroethylene copolymers with a vinylidene fluoride content of from about 10 to about 60 percent by weight; tetrafluoroethylene/ethylene copolymers with an ethylene content of from about 20 to about 70 percent by weight; poly(vinylidene fluoride); poly(vinyl fluoride); siloxane containing polymers such as styrene-b-isoprene-b-dimethylsiloxane triblock copolymers with a styrene content of from about 10 to about 70 percent by weight, an isoprene content of from about 20 to about 50 percent by weight, and a dimethylsiloxane content of from about 10 to about 40 percent by weight; dimethylsiloxane-b-bisphenol A carbonate diblock copolymers with a dimethylsiloxane content of from about 10 to about 70 percent by weight; dimethylsiloxane-b-α methylstyrene diblock copolymers with a dimethylsiloxane content of from about 10 to about 70 percent by weight; sulfur containing polymers such as poly(sulfone); polysulfide rubber (which is a terpolymer of bis(2 chloroethyl) formal/sodium sulfide/1,2,3-trichloro propane); chlorosulfonated poly(ethylene); diene containing polymers such as acrylonitrile/butadiene copolymers with an acrylonitrile content of from about 15 to about 60 percent by weight; acrylonitrile/-butadiene/styrene terpolymers with an acrylonitrile content of from about 15 to about 60 percent by weight, a butadiene content of from about 10 to about 65 percent by weight, and a styrene content of from about 20 to about 30 percent by weight; styrene/butadiene copolymers with a styrene content of from about 10 to about 90 percent by weight; styrene/isoprene copolymers with a styrene content of from about 10 to about 90 percent by weight; isobutylene/isoprene brominated with an isoprene content of about 1.5 percent by weight and a bromine content of 2.1 percent by weight; alkene containing polymers such as ethylene/propylene rubber with an ethylene content of from about 20 to about 60 percent by weight; ethylene/ethylacrylate copolymers with an ethylene content of from about 25 to about 85 percent by weight; ethylene/propylene/diene copolymers with an ethylene content of from about 20 to about 70 percent by weight, a diene content of from about 3 to about 20 percent by weight, and a propylene content of from about 10 to about 77 percent by weight; ethylene/-vinylacetate copolymers with an ethylene content of from about 25 to about 95 percent by weight; and ethylene/maleic anhydride copolymers with an ethylene content of from about 25 to about 75 percent by weight. Additional examples of heat absorbing materials are disclosed in, for example, U.S. Pat. No. 4,832,815, U.S. Pat. No. 4,778,729, and U.S. Pat. No. 4,875,961, the disclosures of each of which are totally incorporated herein by reference. Mixtures of two or more heat absorbing or dissipating materials can also be employed.

The heat absorbing layer or layers are of any effective thickness. Typical thicknesses are from about 1 to about 25 microns, and preferably from about 2 to about 15 microns when one heat absorbing layer is present between the base sheet and the anticurl layer. When two heat absorbing layers are present, one between the base sheet and the anticurl layer and the other between the base sheet and the ink receiving layer or layers, typical thicknesses are from about 1 to about 25 microns, and preferably from about 2 to about 15 microns for the heat absorbing layer situated between the base sheet and the anticurl layer, and from about 1 to about 10 microns, and preferably from about 2 to about 5 microns for the heat absorbing layer situated between the base sheet and the ink receiving layer or layers.

The anticurl layer is of a material that reduces or eliminates curling of the recording sheet of the present invention, even when it is exposed to a wide range of relative humidities. Examples of suitable materials for the anticurl layer include hydrophilic materials, such as (1) hydroxypropylmethyl cellulose, such as Methocel TM K35 LV, available from Dow Chemical Company; (2) hydroxybutylmethyl cellulose, available from Dow Chemical Company; (3) hydroxyethylmethyl cellulose, such as HEM TM, available from British Celanese Ltd., and Tylose MH, MHK available from Kalle A-G; (4) hydroxyethyl cellulose, such as Natrosol 250LR, available from Hercules Chemical Company; (5) ethylhydroxyethyl cellulose, such as Bermocoll, available from Berol Kem, AB, Sweden; (6) salts of carboxymethyl cellulose, such as sodium carboxymethyl cellulose, such as CMC 7HOF, available from Hercules Chemical Company; (7) salts of carboxymethyl hydroxyethyl cellulose, such as sodium carboxymethyl hydroxyethyl cellulose, such as CMHEC 43H, 37L, available from Hercules Chemical Company; (8) methyl cellulose, such as Methocel-A, available from Dow Chemical Company; (9) poly(acrylamide) polymers, available from Scientific Polymer Products; (10) cellulose sulfate, available from Scientific Polymer Products; (11) hydroxyalkylmethyl cellulose (wherein the alkyl group generally has from 1 to about 10 carbon atoms, such as ethyl, propyl or butyl); (12) acrylamide-acrylic acid copolymers; and the like. Additional examples of anticurl materials are disclosed in, for example, copending application U.S. Ser. No. 07/388,449 (Malhotra et al.), filed Aug. 2, 1989, the disclosure of which is totally incorporated herein by reference. Mixtures of two or more anticurl materials can also be used. The anticurl layer is of any effective thickness. Typical thicknesses are from about 1 to about 25 microns, preferably from about 2 to about 15 microns. Preferably, the total combined thickness of both the anticurl layer and the heat absorbing layer situated between the base sheet and the anticurl layer is from about 2 to about 50 microns, and more preferably from about 5 to about 25 microns.

The recording sheets of the present invention can be prepared by any suitable method. For example, the layer coatings can be applied by a number of known techniques, including melt extrusion, reverse roll, solvent extrusion, and dip coating processes. In dip coating, a web of material to be coated is transported below the surface of the coating material by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material is transferred from a steel applicator roll onto the web material to be coated. The metering roll is stationary or is rotating slowly in the direction opposite to that of the applicator roll. In slot extrusion coating, a flat die is used to apply coating materials with the die lips in close proximity to the web of material to be coated. Once the desired amount of coating has been applied to the web, the coating is dried at 25° to 100° C. in an air drier. In melt extrusion, an extruder converts solid pellets or powder of thermoplastic resin into a uniform bubble-free melt at the required temperature, and this melt is extruded through a flat die vertically downward into the nip of the coating rolls where it is deposited on the web of the material to be coated in the form of a film. After cooling, the film is laminated to the web material. An extrusion coater can be used to prepare recording sheets of the present invention by coating a polyester base sheet with fluoro polymers that are not soluble in common solvents.

A specific example of a process for preparing a recording sheet of the present invention entails providing a base sheet such as Mylar TM (in roll form) in a thickness of from about 100 to about 125 microns and applying to one side of the Mylar TM by a solvent extrusion process on a Faustel coater in a thickness of about 2 to about 25 microns a heat dissipating vinylidene fluoride/hexafluoro propylene copolymer, which copolymer is present in a concentration of about 5 percent by weight in a solvent such as acetone. Thereafter, the coating is air dried at about 60° C. and the resulting polymer layer is then overcoated on the Faustel coater with a hydrophilic layer in a thickness of about 1 to about 25 microns of, for example, hydroxypropylmethyl cellulose present in a concentration of 4 percent by weight in a mixture of water (75 percent by weight) and methanol (25 percent by weight). Subsequent to air drying at a temperature of about 100° C., an anticurl two-layered coating on one side of the two-sided base sheet is obtained. After rewinding the coated side of the Mylar TM on an empty core, the uncoated side of the Mylar TM is coated in a thickness of from about 2 to about 25 microns with an ink receiving hydrophilic coating layer such as a blend of hydroxypropylmethyl cellulose, 80 percent by weight, and poly(ethylene oxide), 20 percent by weight, which blend is present in a concentration of about 3 percent by weight in water. Thereafter, the coating is air dried and the resulting transparency can be used in apparatuses such as heat assisted color ink jet printers and the like as indicated herein. Other recording sheets of the present invention can be prepared in a similar or equivalent manner.

Another specific example of a process for preparing a recording sheet of the present invention entails providing a Mylar TM base sheet (in roll form) in a thickness of from 100 to 125 microns and applying to one side of the Mylar TM by the known solvent extrusion process on a Faustel coater, in a thickness of from about 2 to about 25 microns a dimethyl siloxane-b-bisphenol A carbonate copolymer, which copolymer is present in a concentration of about 2 percent by weight in dichloromethane. Thereafter, the coating is air dried at about 100° C. and the resulting polymer layer is overcoated with sodium carboxymethyl cellulose (in a thickness of from about 1 to about 25 microns) present in a concentration of about 2 percent by weight in water. Subsequent to air drying at about 100° C., an anticurl two-layered coating is obtained on one surface of the Mylar TM. Rewinding the coated side onto an empty core and using this roll, the uncoated side of the Mylar TM roll is coated, in a thickness of from about 2 to about 25 microns, with a hydrophobic ink receiving layer blend of chlorinated rubber, 80 percent by weight, and poly(α-methyl styrene), 20 percent by weight, which blend is present in a concentration of about 3 percent by weight in toluene. Thereafter, the coating is air dried at about 100° C. and the resulting transparency can be utilized in a xerographic imaging apparatus, such as those available commercially as the Xerox® 1005 TM, and images can be obtained with optical density values of, for example, 1.6 (black), 0.85 (yellow), 1.45 (magenta), and 1.45 (cyan). Other recording sheets of the present invention can be prepared in a similar or equivalent manner.

The present invention also includes printing and imaging processes with recording sheets of the present invention. One embodiment of the present invention is directed to a process for generating images which comprises generating an electrostatic latent image on an imaging member in an imaging apparatus, developing the latent image with a toner, transferring the developed image to a recording sheet of the present invention, and optionally permanently affixing the transferred image to the recording sheet. The electrostatic latent image can be created on a photosensitive imaging member by the well known electrophotographic process, as described in, for example, U.S. Pat. No. 2,297,691 to Chester Carlson. In addition, the electrostatic latent image can be created on a dielectric imaging member by an ionographic process, which entails applying a charge pattern imagewise to an imaging member, developing the image with a toner, and transferring the developed image to a recording sheet. Further, the recording sheet of the present invention can be employed in electrographic printing processes, which entail generating an electrostatic latent image on a recording sheet of the present invention, developing the latent image with a toner, and optionally permanently affixing the developed image to the recording sheet. Ionographic and electrographic processes are well known, and are described in, for example, U.S. Pat. No. 3,564,556, U.S. Pat. No. 3,611,419, U.S. Pat. No. 4,240,084, U.S. Pat. No. 4,569,584, U.S. Pat. No. 2,919,171, U.S. Pat. No. 4,524,371, U.S. Pat. No. 4,619,515, U.S. Pat. No. 4,463,363, U.S. Pat. No. 4,254,424, U.S. Pat. No. 4,538,163, U.S. Pat. No. 4,409,604, U.S. Pat. No. 4,408,214, U.S. Pat. No. 4,365,549, U.S. Pat. No. 4,267,556, U.S. Pat. No. 4,160,257, and U.S. Pat. No. 4,155,093, the disclosures of each of which are totally incorporated herein by reference.

The recording sheets of the present invention can also be employed in ink jet printing processes. Generally, this embodiment of the present invention is directed to a printing process which comprises (1) incorporating into an ink jet printing apparatus containing an ink a recording sheet of the present invention and causing droplets of the ink to be ejected in an imagewise pattern onto the recording sheet, thereby generating images on the recording sheet. Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium. One type of drop-on-demand system has as its major components an ink filled channel or passageway having a nozzle on one end and a piezoelectric transducer near the other end to produce pressure pulses. Another type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording sheet. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. No. 4,601,777, U.S. Pat. No. 4,251,824, U.S. Pat. No. 4,410,899, U.S. Pat. No. 4,412,224, and U.S. Pat. No. 4,532,530, the disclosures of each of which are totally incorporated herein by reference.

The recording sheets can be used in any other printing or imaging process, such as printing with pen plotters, handwriting with ink pens (either aqueous or nonaqueous based inks), offset printing processes, or the like, provided that the ink employed to form the image is compatible with the material selected as the ink receiving layer of the recording sheet.

Generally, the term "curl" refers to the distance between the base line of the arc formed by recording sheet when viewed in cross-section across its width (or shorter dimension—for example, 8.5 inches in an 8.5×11 inch sheet, as opposed to length, or longer dimension—for example, 11 inches in an 8.5×11 inch sheet) and the midpoint of the arc. To measure curl, a sheet can be held with the thumb and forefinger in the middle of one of the long edges of the sheet (for example, in the middle of one of the 11 inch edges in an 8.5×11 inch sheet) and the arc formed by the sheet can be matched against a pre-drawn standard template curve ranging from zero (flat) to 65 millimeters or more (highly curled). The recording sheets of the present invention generally exhibit curl values of from 0 to about 10 millimeters. Generally, acceptable curl values for recording sheets employed in electrophotographic processes are from 0 to about 15 millimeters and acceptable curl values for recording sheets employed in ink jet printing processes are from 0 to about 20 millimeters. Image recording on more highly curled substrates can be imprecise, and higher degrees of curl can result in jamming when the sheet is fed through the machine. In addition, in ink jet printing processes, since the printhead is always moving, it can be entangled with curled sheets, thereby jamming the machine. In contrast to recording sheets of the present invention, transparencies coated on one side with an ink receiving layer and with no heat absorbing layer will curl into tubes when subjected to varying humidity conditions and heat. Transparency materials coated on both sides with ink receiving layers and subjected to varying humidity conditions and heat typically will exhibit curl values of from about 100 to about 150 millimeters. Transparency materials having a moisture resistant coating, such as those disclosed in copending application Ser. No. 07/388,449, when subjected to varying humidity conditions and heat will typically exhibit curl values of from about 50 to about 100 millimeters.

The recording sheets of the present invention also exhibit little or no blocking. Blocking refers to the transfer of ink or toner from a printed image from one sheet to another when recording sheets are stacked together. The recording sheets of the present invention exhibit substantially no blocking under, for example, environmental conditions of from about 20 to about 80 percent relative humidity and at temperatures of about 65° C.

Further, the recording sheets of the present invention exhibit high resistance to humidity. Resistance to humidity generally is the capacity of a recording sheet to control the blooming and bleeding of printed images, wherein blooming represents intra-diffusion of dyes and bleeding represents inter-diffusion of dyes. The blooming test can be performed by printing a bold filled letter such as T on a recording sheet and placing the sheet in a constant environment chamber preset for humidity and temperature. The vertical and horizontal spread of the dye in the letter T is monitored periodically under a microscope. Resistance to humidity limit is established when the dyes selected begin to diffuse out of the letter T. The bleeding test is performed by printing a checker board square pattern of various different colors and measuring the inter-diffusion of colors as a function of humidity and temperature.

Specific embodiments of the invention will now be described in detail. These examples are intended to be illustrative, and the invention is not limited to the materials, conditions, or process parameters set forth in these embodiments. All parts and percentages are by weight unless otherwise indicated.

The optical density measurements recited herein were obtained on a Pacific Spectrograph Color System. The system consists of two major components, an optical sensor and a data terminal. The optical sensor employs a 6 inch integrating sphere to provide diffuse illumination and 8 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters and the entry of tristimulus values, and an alphanumeric keyboard for entry of product standard information.

EXAMPLE I

Twenty transparent recording sheets were prepared by the solvent extrusion process (single side each time initially) on a Faustel Coater by providing for each a Mylar™ base sheet (roll form) with a thickness of 75 microns and coating the base sheet with a copolymer of vinylidene fluoride/hexafluoropropylene (Viton E-45, obtained from E.I. Du Pont de Nemours & Company), which copolymer was present in a concentration of 5 percent by weight in acetone. Subsequent to air drying at 60° C. and monitoring the difference in weight prior to and subsequent to coating, the dried Mylar™ rolls were coated on one side with 0.5 gram, 5 microns in thickness, of a vinylidene fluoride/hexafluoro propylene copolymer heat absorbing layer. The dried heat absorbing layer was then overcoated on the Faustel Coater in each instance with a second anticurl hydrophilic layer of hydroxypropylmethyl cellulose (Methocel K35LV, obtained from Dow Chemical Company), present in a concentration of 4 percent by weight in a mixture of water (75 percent by weight) and methanol (25 percent by weight). Subsequent to air drying at a temperature of 100° C. and monitoring the difference in weight prior to and subsequent to coating, the sheets were coated with 0.7 gram, in a thickness of 7 microns, of the hydrophilic polymer anticurl layer in contact with the vinylidene fluoride/hexafluoro propylene heat absorbing layer. Rewinding the coated side of the Mylar™ onto an empty core and using these rolls, the uncoated sides of the Mylar™ were coated in each instance (20 sheets) with a hydrophilic ink receiving layer comprising a blend of 25 percent by weight sodium carboxymethyl cellulose (CMC 7HOF, obtained from Hercules Chemical Company), 25 percent by weight of poly(ethylene oxide) (POLYOX WSRN-3000, obtained from Union Carbide Company), and 50 percent by weight of hydroxypropylmethyl cellulose (Methocel D35LV, obtained from Dow Chemical Company), which blend was present in a concentration of 4 percent by weight in water. Subsequent to air drying at 100° C. and monitoring the weight prior to and subsequent to coating, the sheets were coated with 0.8 gram, in a thickness of 8 microns, of the ink receiving layer. Half of these sheets (10) were then fed individually into a Xerox® 4020™ ink jet color printer containing four separate inks (commercially available and obtained from Sharp Inc. as inks for the 4020™) which comprised water, glycols, and magenta, cyan, yellow or black dyes, respectively. Images were obtained on the ink receiving layers with average optical densities for the 10 sheets of 1.15 (black), 1.34 (magenta), 0.84 (cyan) and 0.57 (yellow). These imaged transparency sheets were then stacked one over the other (the imaged side of one sheet in contact with the nonimaged side of the adjacent sheet) and placed in an environment chamber preset at 80° F. and 80 percent relative humidity (RH) for a period of 24 hours. Under these conditions, no transfer of colors occurred from the imaged side of one sheet to the nonimaged side of the adjacent sheet, and the optical density of the images remained unchanged. The imaged sheets did not stick together and exhibited a curl value of zero. Upon lowering the humidity of the environment chamber from 80 percent to 20 percent, the imaged sheets evidenced an acceptable curl value of between zero and 10 millimeters and no transfer of ink occurred from one sheet to the adjacent sheet. The other 10 sheets were fed into an experimental heat assisted ink jet printer test fixture equipped with a platen heater. Each of the sheets was imaged as it lay on the stationary platen heater set at 65° C., using movable ink jet heads carrying an aqueous black ink, for a period of from about 30 to about 60 seconds. Under these conditions the recording sheets of the present invention yielded acceptable curl values of between zero and 10 millimeters, and the average optical density of the images was 2.5.

EXAMPLE II

Twenty transparent recording sheets were prepared by the solvent extrusion process (single side each time initially) on a Faustel Coater by providing a Mylar TM base sheet (roll form) in a thickness of 100 microns and coating the base sheet with a copolymer, dimethylsiloxane-b-bisphenol A carbonate (Scientific Polymer Products #789), which solution was present in a concentration of 5 percent by weight in dichloromethane. Subsequent to air drying at 100° C. and monitoring the difference in weight prior to and subsequent to coating, the dried Mylar TM roll was coated on one side with 0.9 gram, 9 microns in thickness, of a dimethylsiloxane-b-bisphenol A carbonate copolymer heat absorbing layer. The dried copolymer layer was then overcoated on the Faustel Coater with a hydrophilic layer of sodium carboxymethyl cellulose (CMC 7HOF, obtained from Hercules Chemical Company), which cellulose was present in a concentration of 2 percent by weight in a mixture of methanol (25 percent by weight) and water (75 percent by weight). Subsequent to air drying at a temperature of 100° C. and monitoring the difference in weight prior to and subsequent to coating, each of the 20 sheets were coated with 0.6 gram, 6 microns in thickness, of the hydrophilic polymer anticurl layer in contact with the dimethyl siloxane-b-bisphenol A carbonate copolymer heat absorbing layer. Rewinding the coated side of the Mylar TM coated with the two layers on an empty core and using this roll, the uncoated side of the Mylar TM was coated with a hydrophilic ink receiving layer comprising a blend of 80 percent by weight of hydroxypropylmethyl cellulose (Methocel K35LV, obtained from Dow Chemical Company) and 20 percent by weight of poly(ethylene oxide) (POLYOX WSRN-3000, obtained from Union Carbide Company), which blend was present in a concentration of 4 percent by weight in water. Subsequent to air drying at 100° C. and monitoring the weight prior to and subsequent to coating, each of the sheets was coated with 0.8 gram, in a thickness of 8 microns, of the ink receiving layer. Ten of the transparency sheets were then fed individually into a Xerox® 4020 TM ink jet color printer as in Example I, and images were obtained with average optical densities of 1.10 (black), 1.25 (magenta), 0.80 (cyan) and 0.57 (yellow). These imaged sheets were stacked one over the other and placed in an environment chamber preset at 80° F. and 80 percent RH for a period of 24 hours. Under these conditions, no transfer of colors occurred from the imaged side of one sheet to the nonimaged side of the adjacent sheet, and the optical density of the images remained unchanged. The imaged sheets did not stick together and yielded a curl value of zero. Upon lowering the humidity (RH) of the environment chamber from 80 percent to 20 percent, the imaged sheets yielded curl values of between zero and 10 millimeters, and no ink transfer occurred from one transparency sheet to the adjacent transparency sheet. The other 10 sheets were fed into an experimental heat assisted ink jet printer equipped with a platen heater. Each of the sheets was imaged as it lay on the stationary platen heater set at 65° C., using movable ink jet heads carrying an aqueous black ink, for a period of from about 30 to about 60 seconds. Under these conditions the transparencies of the present invention yielded acceptable curl values of between zero and 10 millimeters, and the average optical density of the images was 2.5.

EXAMPLE III

Ten transparent recording sheets were prepared by the solvent extrusion process (single side each time) on a Faustel Coater by providing a Mylar TM base sheet (roll form) in a thickness of 100 microns and coating the base sheet with a copolymer of styrene/butadiene (butadiene content of 70 percent by weight, obtained from Shell Company), which solution was present in a concentration of 2 percent by weight of toluene. Subsequent to air drying at 100° C. and monitoring the difference in weight prior to and subsequent to coating, the dried Mylar TM roll was coated on one side with 0.3 gram, 3 microns in thickness, of the styrene/butadiene copolymer heat absorbing layer. The dried copolymer layer was then overcoated on the Faustel Coater with an anticurl layer of a hydrophilic sodium carboxymethyl cellulose (CMC 7HOF, obtained from Hercules Chemical Company), which cellulose was present in a concentration of 1 percent by weight in a mixture of methanol (25 percent by weight) and water (75 percent by weight). Subsequent to air drying at a temperature of 100° C. and monitoring the difference in weight prior to and subsequent to coating, the 10 transparent sheets were coated with 0.3 gram, 3 microns in thickness, of the hydrophilic polymer anticurl layer in contact with the styrene/butadiene copolymer heat absorbing layer. Rewinding the coated side of the Mylar TM on an empty core, and using this roll with the two layers, the uncoated side of the Mylar TM was coated with a hydrophobic ink receiving layer comprising a blend of 80 percent by weight of poly(α-methylstyrene) (Amoco resin 18-29, obtained from Amoco Chemical Company) and 20 percent by weight of poly(chloroprene), which blend was present in a concentration of 2 percent by weight in toluene. Subsequent to air drying at 100° C. and monitoring the weight prior to and subsequent to coating, the sheets were coated with 0.3 gram, in a thickness of 3 microns, of the ink receiving layer. The resulting 10 transparency sheets were then fed individually into a Xerox® 1005 TM color xerographic imaging apparatus. The average optical density of the images obtained was 1.6 (black), 0.80 (yellow), 1.40 (magenta) and 1.50 (cyan). These images could not be handwiped or lifted off with 3M scotch tape 60 seconds subsequent to their preparation. The curl value of these sheets before and after printing was in the acceptable range of zero to 10 millimeters.

Other embodiments and modifications of the present invention may occur to those skilled in the art subsequent to a review of the information presented herein; these embodiments and modifications, as well as equivalents thereof, are also included within the scope of this invention.

What is claimed is:

1. A recording sheet which comprises, in the order stated, an ink receiving layer, a base sheet, a polymeric heat absorbing layer, and a polymeric anticurl layer.

2. A recording sheet according to claim 1 wherein the sheet is substantially transparent.

3. A recording sheet according to claim 2 wherein the base sheet is of a material selected from the group consisting of polyesters, polycarbonates, polysulfones, cellulose triacetate, polyvinyl chloride, cellophane, polyvinyl fluoride, and mixtures thereof.

4. A recording sheet according to claim 1 wherein the sheet is opaque.

5. A recording sheet according to claim 4 wherein the base sheet is of a material selected from the group consisting of paper, opaque plastics, and filled polymers.

6. A recording sheet according to claim 1 wherein the base sheet has a thickness of from about 50 to about 125 microns.

7. A recording sheet according to claim 1 wherein the ink receiving layer is hydrophilic.

8. A recording sheet according to claim 1 wherein the ink receiving layer is of a material selected from the group consisting of:

a. binary blends comprising poly(ethylene oxide) and a component selected from the group consisting of (i) hydroxypropyl methyl cellulose; (ii) vinylmethyl ether/maleic acid copolymers; (iii) acrylamide/acrylic acid copolymers; (iv) carboxymethylhydroxyethyl cellulose salts; (v) hydroxyethyl cellulose; (vi) water soluble ethylhydroxyethyl cellulose; (vii) cellulose sulfate; (viii) poly(vinyl alcohol) homopolymers; (ix) poly(vinyl pyrrolidone); (x) hydroxybutylmethyl cellulose; (xi) hydroxypropyl cellulose; (xii) poly(2-acrylamido-2-methyl propane sulfonic acid); (xiii) methyl cellulose; (xiv) hydroxyethylmethyl cellulose; (xv) cellulose acetate; (xvi) cellulose acetate hydrogen phthalate; (xvii) hydroxypropylmethyl cellulose phthalate; (xviii) vinyl alcohol copolymers; (xix) salts of carboxymethyl cellulose; and (xx) vinyl pyrrolidone/vinyl acetate copolymers;

b. ternary blends comprising poly(ethylene oxide), salts of carboxymethyl cellulose, and a component selected from the group consisting of (i) hydroxypropyl methyl cellulose; (ii) vinylmethyl ether/maleic acid copolymers; (iii) acrylamide/acrylic acid copolymers; (iv) salts of carboxymethylhydroxyethyl cellulose; (v) hydroxyethyl cellulose; (vi) water soluble ethylhydroxyethyl cellulose; (vii) cellulose sulfate; (viii) poly(vinyl alcohol); (ix) poly(vinyl pyrrolidone); (x) hydroxybutylmethyl cellulose; (xi) hydroxypropyl cellulose; (xii) poly(2-acrylamido-2-methyl propane sulfonic acid); (xiii) methyl cellulose; (xiv) hydroxyethylmethyl cellulose; (xv) poly(diethylene triamine-co-adipic acid); (xvi) poly(imidazoline) quaternized; (xvii) poly(ethylene imine) epichlorohydrin modified; (xviii) poly(N,N dimethyl-3,5-dimethylene piperidinium chloride); and (xix) poly(ethylene imine) ethoxylated; and c. ternary blends of poly(ethylene oxide), hydroxyalkylmethyl cellulose, and a component selected from the group consisting of (i) hydroxypropyl cellulose; (ii) vinylmethyl ether/maleic acid copolymers; (iii) acrylamide/acrylic acid copolymers; (iv) salts of carboxymethylhydroxyethyl cellulose; (v) hydroxyethyl cellulose; (vi) water soluble ethylhydroxyethyl cellulose; (vii) cellulose sulfate; (viii) poly(vinyl alcohol); (ix) poly(vinyl pyrrolidone); (x) poly(2-acrylamido-2-methyl propane sulfonic acid); (xi) methyl cellulose; (xii) salts of carboxymethyl cellulose; (xiii) poly(diethylene triamine-co-adipic acid); (xiv) poly(imidazoline) quaternized; (xv) poly(ethylene imine) epichlorohydrin modified; (xvi) poly(N,N-dimethyl-3,5-dimethylene piperidinium chloride); and (xvii) poly(ethyleneimine) ethoxylated.

9. A recording sheet according to claim 8 wherein the ink receiving layer is a binary blend comprising poly(ethylene oxide) and a component selected from the group consisting of vinylalcohol/vinylacetate copolymers and vinylalcohol/vinylbutyral copolymers.

10. A recording sheet according to claim 8 wherein the ink receiving layer is of a material selected from the group consisting of:

a. binary blends comprising from about 10 to about 90 percent by weight poly(ethylene oxide) and from about 10 to about 90 percent by weight of a component selected from the group consisting of (i) hydroxypropyl methyl cellulose; (ii) vinylmethyl ether/maleic acid copolymers; (iii) acrylamide/acrylic acid copolymers; (iv) carboxymethylhydroxyethyl cellulose salts; (v) hydroxyethyl cellulose; (vi) water soluble ethylhydroxyethyl cellulose; (vii) cellulose sulfate; (viii) poly(vinyl alcohol) homopolymers; (ix) poly(vinyl pyrrolidone); (x) hydroxybutylmethyl cellulose; (xi) hydroxypropyl cellulose; (xii) poly(2-acrylamido-2-methyl propane sulfonic acid); (xiii) methyl cellulose; (xiv) hydroxyethylmethyl cellulose; (xv) cellulose acetate; (xvi) cellulose acetate hydrogen phthalate; (xvii) hydroxypropylmethyl cellulose phthalate; (xviii) vinyl alcohol copolymers; (xix) salts of carboxymethyl cellulose; and (xx) vinyl pyrrolidone/vinyl acetate copolymers;

b. ternary blends comprising from about 10 to about 50 percent by weight poly(ethylene oxide), from about 5 to about 85 percent by weight of salts of carboxymethyl cellulose, and from about 5 to about 45 percent by weight of a component selected from the group consisting of (i) hydroxypropyl methyl cellulose; (ii) vinylmethyl ether/maleic acid copolymers; (iii) acrylamide/acrylic acid copolymers; (iv) salts of carboxymethylhydroxyethyl cellulose; (v) hydroxyethyl cellulose; (vi) water soluble ethylhydroxyethyl cellulose; (vii) cellulose sulfate; (viii) poly(vinyl alcohol); (ix) poly(vinyl pyrrolidone); (x) hydroxybutylmethyl cellulose; (xi) hydroxypropyl cellulose; (xii) poly(2-acrylamido-2-methyl propane sulfonic acid); (xiii) methyl cellulose; (xiv) hydroxyethylmethyl cellulose; (xv) poly(diethylene triamine-co-adipic acid); (xvi) poly(imidazoline) quaternized; (xvii) poly(ethylene imine) epichlorohydrin modified; (xviii) poly(N,N dimethyl-3,5-dimethylene piperidinium chloride); and (xix) poly(ethylene imine) ethoxylated; and c. ternary blends comprising from about 10 to about 50 percent by weight poly(ethylene oxide), from about 5 to about 85 percent by weight hydroxyalkylmethyl cellulose, and from about 5 to about 45 percent by weight of a component selected from the group consisting of (i) hydroxypropyl cellulose; (ii) vinylmethyl ether/maleic acid copolymers; (iii) acrylamide/acrylic acid copolymers; (iv) salts of carboxymethylhydroxyethyl cellulose; (v) hydroxyethyl cellulose; (vi) water soluble ethylhydroxyethyl cellulose; (vii) cellulose sulfate; (viii) poly(vinyl alcohol); (ix) poly(vinyl pyrrolidone); (x) poly(2-acrylamido-2-methyl propane sulfonic acid); (xi) methyl cellulose; (xii) salts of carboxymethyl cellulose; (xiii) poly(diethylene triamine-co-adipic acid); (xiv) poly(imidazoline) quaternized; (xv) poly(ethylene imine) epichlorohydrin modified; (xvi) poly(N,N-dimethyl-3,5-dimethylene piperidinium chloride); and (xvii) poly(ethyleneimine) ethoxylated.

11. A recording sheet according to claim 1 wherein the ink receiving layer is hydrophobic.

12. A recording sheet according to claim 1 wherein the ink receiving layer is of a material comprising a binary blend of poly(α-methyl styrene) and a component selected from the group consisting of (i) poly(ethylene oxide); (ii) halogenated rubber; (iii) halogenated poly(propylene); (iv) halogenated poly(ethylene); (v) poly(caprolactone); (vi) poly(chloroprene); (vii) poly(1,4-butylene adipate); (viii) poly(vinylmethylether); (ix) poly(vinylisobutylether); (x) styrene-butadiene copolymers; and (xi) ethyl cellulose.

13. A recording sheet according to claim 12 wherein the ink receiving layer is of a material comprising a binary blend of from about 5 to about 95 percent by weight poly(α-methyl styrene) and from about 5 to about 95 percent by weight of a component selected from the group consisting of (i) poly(ethylene oxide); (ii) halogenated rubber; (iii) halogenated poly(propylene); (iv) halogenated poly(ethylene); (v) poly(caprolactone); (vi) poly(chloroprene); (vii) poly(1,4-butylene adipate); (viii) poly(vinylmethylether); (ix) poly(-vinylisobutylether); (x) styrene-butadiene copolymers; and (xi) ethyl cellulose.

14. A recording sheet according to claim 1 wherein the ink receiving layer has a thickness of from about 1 to about 25 microns.

15. A recording sheet according to claim 1 wherein the ink receiving layer contains a filler material in an amount of from about 1 to about 25 percent by weight of the ink receiving layer, said filler being selected from the group consisting of inorganic oxides, colloidal silicas, calcium carbonate, and mixtures thereof.

16. A recording sheet according to claim 1 wherein the heat absorbing layer is of a material selected from the group consisting of (i) vinylidene fluoride copolymers; (ii) tetrafluoro propylene/propylene copolymers; (iii) tetrafluoroethylene/ethylene copolymers; (iv) tetrafluoroethylene/hexafluoropropylene copolymers; (v) poly(vinyl fluoride); (vi) poly(vinylidene fluoride) homopolymers; (vii) styrene-b-isoprene-b-dimethylsiloxane triblock copolymers; (viii) dimethyl siloxane-b-bisphenol A carbonate diblock copolymers; (ix) dimethylsiloxane-b-α-methyl styrene diblock copolymers; (x) poly(sulfone); (xi) poly(sulfide); (xii) chlorosulfonated poly(ethylene); (xiii) acrylonitrile/butadiene copolymers; (xiv) acrylonitrile/butadiene/styrene terpolymers; (xv) styrene/butadiene copolymers; (xvi) styrene/isoprene diblock copolymers; (xvii) isobutylene/isoprene halogenated copolymers; (xviii) ethylene/propylene rubber; (xix) ethylene/ethylacrylate copolymers; (xx) ethylene/propylene/diene terpolymers; (xxi) ethylene/vinyl acetate copolymers; (xxii) ethylene/maleic anhydride copolymers; and mixtures thereof.

17. A recording sheet according to claim 16 wherein the heat absorbing layer is of a material selected from the group consisting of vinylidene fluoride/hexafluoropropylene copolymers, vinylidene fluoride/hexafluoro propylene/tetrafluoroethylene copolymers, vinylidene fluoride/tetrafluoroethylene/perfluoro methylvinyl ether terpolymers, vinylidene fluoride/chloro trifluoroethylene copolymers, and mixtures thereof.

18. A recording sheet according to claim 1 wherein the heat absorbing layer has a thickness of from about 1 to about 25 microns.

19. A recording sheet according to claim 1 wherein the anticurl layer is of a material selected from the group consisting of (i) hydroxypropylmethyl cellulose; (ii) hydroxybutylmethyl cellulose; (iii) hydroxyethylmethyl cellulose; (iv) hydroxyethyl cellulose; (v) ethylhydroxyethyl cellulose; (vi) salts of carboxymethyl cellulose; (vii) salts of carboxymethyl hydroxyethyl cellulose; (viii) methyl cellulose; (ix) poly(acrylamide) homopolymers; (x) cellulose sulfate; (xi) hydroxyalkylmethyl cellulose; (xii) acrylamide copolymers; and mixtures thereof.

20. A recording sheet according to claim 19 wherein the anticurl layer is of a material selected from the group consisting of acrylamide-acrylic acid copolymers and mixtures thereof.

21. A recording sheet according to claim 1 wherein the anticurl layer has a thickness of from about 1 to about 25 microns.

22. A recording sheet which comprises, in the order stated, an ink receiving layer, a base sheet, a polymeric heat absorbing layer, and a polymeric anticurl layer, wherein an additional polymeric heat absorbing layer is situated between the ink receiving layer and the base sheet.

23. A recording sheet according to claim 22 wherein the heat absorbing layer situated between the base sheet and the anticurl layer has a thickness of from about 1 to about 25 microns and the additional heat absorbing layer situated between the base sheet and the ink receiving layer has a thickness of from about 1 to about 10 microns.

24. A process which comprises applying a recording liquid in an imagewise pattern to a recording sheet which comprises, in the order stated, an ink receiving layer, a base sheet, a polymeric heat absorbing layer, and a polymeric anticurl layer.

25. A process according to claim 24 wherein the recording sheet has an additional polymeric heat absorbing layer situated between the ink receiving layer and the base sheet.

26. A printing process which comprises (1) incorporating into an ink jet printing apparatus containing an ink a recording sheet which comprises, in the order stated, an ink receiving layer, a base sheet, a polymeric heat absorbing layer, and a polymeric anticurl layer, and causing droplets of the ink to be ejected in an imagewise pattern onto the recording sheet, thereby generating images on the recording sheet.

27. A process according to claim 26 wherein the recording sheet has an additional polymeric heat absorbing layer situated between the ink receiving layer and the base sheet.

28. A printing process according to claim 26 wherein the ink receiving layer is hydrophilic.

29. A printing process according to claim 26 wherein the ink receiving layer is of a material selected from the group consisting of:

a. binary blends comprising poly(ethylene oxide) and a component selected from the group consisting of (i) hydroxypropyl methyl cellulose; (ii) vinylmethyl ether/maleic acid copolymers; (iii) acrylamide/acrylic acid copolymers; (iv) carboxymethylhydroxyethyl cellulose salts; (v) hydroxyethyl cellulose; (vi) water soluble ethylhydroxyethyl cellulose; (vii) cellulose sulfate; (viii) poly(- vinyl alcohol)homopolymers; (ix) poly(vinyl pyrrolidone); (x) hydroxybutylmethyl cellulose; (xi) hydroxypropyl cellulose; (xii) poly(2-acrylamido-2-methyl propane sulfonic acid); (xiii) methyl cellulose; (xiv) hydroxyethylmethyl cellulose; (xv) cellulose acetate; (xvi) cellulose acetate hydrogen phthalate; (xvii) hydroxypropylmethyl cellulose phthalate; (xviii) vinyl alcohol copolymers; (xix) salts of carboxymethyl cellulose; and (xx) vinyl pyrrolidone/vinyl acetate copolymers;

b. ternary blends comprising poly(ethylene oxide), salts of carboxymethyl cellulose, and a component selected from the group consisting of (i) hydroxypropyl methyl cellulose; (ii) vinylmethyl ether/-maleic acid copolymers; (iii) acrylamide/acrylic acid copolymers; (iv) salts of carboxymethylhydroxyethyl cellulose; (v) hydroxyethyl cellulose; (vi) water soluble ethylhydroxyethyl cellulose; (vii) cellulose sulfate; (viii) poly(vinyl alcohol); (ix) poly(vinyl pyrrolidone); (x) hydroxybutylmethyl cellulose; (xi) hydroxypropyl cellulose; (xii) poly(2-acrylamido-2-methyl propane sulfonic acid); (xiii) methyl cellulose; (xiv) hydroxyethylmethyl cellulose; (xv) poly(diethylene triamine-co-adipic acid); (xvi) poly(imidazoline) quaternized; (xvii) poly(ethylene imine) epichlorohydrin modified; (xviii) poly(N,N dimethyl-3,5-dimethylene piperidinium chloride); and (xix) poly(ethylene imine) ethoxylated; and c. ternary blends of poly(ethylene oxide), hydroxyalkylmethyl cellulose, and a component selected from the group consisting of (i) hydroxypropyl cellulose; (ii) vinylmethyl ether/maleic acid copolymers; (iii) acrylamide/acrylic acid copolymers; (iv) salts of carboxymethylhydroxyethyl cellulose; (v) hydroxyethyl cellulose; (vi) water soluble ethylhydroxyethyl cellulose; (vii) cellulose sulfate; (viii) poly(vinyl alcohol); (ix) poly(vinyl pyrrolidone); (x) poly(2-acrylamido-2-methyl propane sulfonic acid); (xi) methyl cellulose; (xii) salts of carboxymethyl cellulose; (xiii) poly(diethylene triamine-co-adipic acid); (xiv) poly(imidazoline) quaternized; (xv) poly(ethylene imine) epichlorohydrin modified; (xvi) poly(N,N-dimethyl-3,5-dimethylene piperidinium chloride); and (xvii) poly(ethyleneimine) ethoxylated.

30. A printing process according to claim 29 wherein the ink receiving layer is a binary blend comprising poly(ethylene oxide) and a component selected from the group consisting of vinylalcohol/vinylacetate copolymers and vinylalcohol/vinylbutyral copolymers.

31. A printing process according to claim 29 wherein the ink receiving layer is of a material selected from the group consisting of:

a. binary blends comprising from about 10 to about 90 percent by weight poly(ethylene oxide) and from about 10 to about 90 percent by weight of a component selected from the group consisting of (i) hydroxypropyl methyl cellulose; (ii) vinylmethyl ether/maleic acid copolymers; (iii) acrylamide/acrylic acid copolymers; (iv) carboxymethylhydroxyethyl cellulose salts; (v) hydroxyethyl cellulose; (vi) water soluble ethylhydroxyethyl cellulose; (vii) cellulose sulfate; (viii) poly(vinyl alcohol) homopolymers; (ix) poly(vinyl pyrrolidone); (x) hydroxybutylmethyl cellulose; (xi) hydroxypropyl cellulose; (xii) poly(2-acrylamido-2-methyl propane sulfonic acid); (xiii) methyl cellulose; (xiv) hydroxyethylmethyl cellulose; (xv) cellulose acetate; (xvi) cellulose acetate hydrogen phthalate; (xvii) hydroxypropylmethyl cellulose phthalate; (xviii) vinyl alcohol copolymers; (xix) salts of carboxymethyl cellulose; and (xx) vinyl pyrrolidone/-vinyl acetate copolymers;

b. ternary blends comprising from about 10 to about 50 percent by weight poly(ethylene oxide), from about 5 to about 85 percent by weight of salts of carboxymethyl cellulose, and from about 5 to about 45 percent by weight of a component selected from the group consisting of (i) hydroxypropyl methyl cellulose; (ii) vinylmethyl ether/maleic acid copolymers; (iii) acrylamide/acrylic acid copolymers; (iv) salts of carboxymethylhydroxyethyl cellulose; (v) hydroxyethyl cellulose; (vi) water soluble ethylhydroxyethyl cellulose; (vii) cellulose sulfate; (viii) poly(vinyl alcohol); (ix) poly(vinyl pyrrolidone); (x) hydroxybutylmethyl cellulose; (xi) hydroxypropyl cellulose; (xii) poly(2-acrylamido-2-methyl propane sulfonic acid); (xiii) methyl cellulose; (xiv) hydroxyethylmethyl cellulose; (xv) poly(diethylene triamine-co-adipic acid); (xvi) poly(imidazoline) quaternized; (xvii) poly(ethylene imine) epichlorohydrin modified; (xviii) poly(N,N dimethyl-3,5-dimethylene piperidinium chloride); and (xix) poly(ethylene imine) ethoxylated; and c. ternary blends comprising from about 10 to about 50 percent by weight poly(ethylene oxide), from about 5 to about 85 percent by weight hydroxyalkylmethyl cellulose, and from about 5 to about 45 percent by weight of a component selected from the group consisting of (i) hydroxypropyl cellulose; (ii) vinylmethyl ether/maleic acid copolymers; (iii) acrylamide/acrylic acid copolymers; (iv) salts of carboxymethylhydroxyethyl cellulose; (v) hydroxyethyl cellulose; (vi) water soluble ethylhydroxyethyl cellulose; (vii) cellulose sulfate; (viii) poly(vinyl alcohol); (ix) poly(vinyl pyrrolidone); (x) poly(2-acrylamido-2-methyl propane sulfonic acid); (xi) methyl cellulose; (xii) salts of carboxymethyl cellulose; (xiii) poly(diethylene triamine-co-adipic acid); (xiv) poly(imidazoline) quaternized; (xv) poly(ethylene imine) epichlorohydrin modified; (xvi) poly(N,N-dimethyl-3,5-dimethylene piperidinium chloride); and (xvii) poly(ethyleneimine) ethoxylated.

* * * * *